(12) United States Patent
Rybarczyk et al.

(10) Patent No.: US 9,864,364 B2
(45) Date of Patent: Jan. 9, 2018

(54) METHOD AND APPARATUS FOR RETRIEVING TIME-BASED EVENT DATA INTO UNIFIED ACTIVITY HIERARCHY ACROSS PROCESS CLUSTERS

(71) Applicant: Honeywell International Inc., Morristown, NJ (US)

(72) Inventors: David F. Rybarczyk, Phoenix, AZ (US); Ashwath Kakde SunderKumar, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 357 days.

(21) Appl. No.: 14/577,657

(22) Filed: Dec. 19, 2014

(65) Prior Publication Data

US 2016/0132043 A1 May 12, 2016

Related U.S. Application Data

(60) Provisional application No. 62/076,841, filed on Nov. 7, 2014.

(51) Int. Cl.
*G05B 19/418* (2006.01)
*G06F 9/54* (2006.01)
*G06F 11/07* (2006.01)

(52) U.S. Cl.
CPC .......... *G05B 19/418* (2013.01); *G06F 9/542* (2013.01); *G06F 11/0769* (2013.01); *G06F 11/0775* (2013.01); *G05B 2219/31288* (2013.01)

(58) Field of Classification Search
CPC ........ G05B 19/418; G05B 2219/31288; G06F 9/542; G06F 11/0769; G06F 11/0775
(Continued)

(56) References Cited

U.S. PATENT DOCUMENTS 7,653,721 B1 * 1/2010 Romanov ............. G06F 9/4443
709/224
9,367,579 B1 * 6/2016 Kumar ............. G06F 17/30371
(Continued)

OTHER PUBLICATIONS

European Search Report issued for EP 15193054.2 dated Mar. 29, 2016, 10 pgs.
(Continued)

*Primary Examiner* — Vincent Tran

(57) ABSTRACT

A method includes receiving notifications associated with batch execution instances executed by multiple devices. The notifications identify events occurring in an industrial process control and automation system. The method also includes creating a unique namespace for association with the notifications. The method further includes storing records identifying the notifications in a unified activity hierarchy based on the unique namespace. Creating the unique namespace could include creating an initial namespace using one or more fields associated with a parent process being executed. The parent process can activate a child process, and a namespace for the child process can contain the initial namespace and use one or more fields associated with the child process. The child process can activate a grand-child process, and a namespace for the grand-child process can contain the initial namespace and the namespace for the child process and use one or more fields associated with the grand-child process.

20 Claims, 25 Drawing Sheets

(58) Field of Classification Search
USPC .......................................................... 700/11
See application file for complete search history.

(56) References Cited

U.S. PATENT DOCUMENTS

| | | | | |
|---|---|---|---|---|
| 2006/0074714 A1* | 4/2006 | Aziz | ...................... | G06Q 10/06 |
| | | | | 705/2 |
| 2006/0271341 A1* | 11/2006 | Brown | ...................... | G06F 8/20 |
| | | | | 703/1 |
| 2008/0010641 A1* | 1/2008 | Zhao | .................. | G05B 23/0264 |
| | | | | 718/101 |
| 2010/0281456 A1* | 11/2010 | Eizenman | ................. | G06F 8/20 |
| | | | | 717/104 |
| 2011/0257767 A1* | 10/2011 | Worek | ............... | G05B 19/4183 |
| | | | | 700/15 |
| 2014/0137086 A1* | 5/2014 | Chamieh | ............... | G06F 9/4428 |
| | | | | 717/139 |

OTHER PUBLICATIONS

Wikipedia, "SCADA", URL: https://en.wikipedia.org/w.index.php?title=SCADA&oldid=632691050, XP002755067, dated Nov. 6, 2014, 10 pgs.

Wikipedia, "Unique Key", URL: https://en.wikipedia.org/w.index.php?title=Unique_Key&oldid=631641785, XP002755068, dated Oct. 29, 2014, 6 pgs.

Wikipedia, "Namespace", URL: https://en.wikipedia.org/w.index.php?title=Namespace&oldid=629888686, XP002755050, dated Oct. 16, 2014, 10 pgs.

* cited by examiner

SERVER 1

| EventTime | EventID | ExecutionID | ConditionName | SubConditionName | Source |
|---|---|---|---|---|---|
| 8/4/14 4:24 PM | 235709 | 907984168711129300000 | BatchCreation | PROCEDURE | ICPP_PROC |
| 8/4/14 4:24 PM | 235715 | 907984168711129300000 | Formula | F1 | ICPP_PROC |
| 8/4/14 4:24 PM | 235719 | 907984168711129300000 | Start of Control | $7e0213e8492660c5-0004;UnitPro | ICPP_PROC |
| 8/4/14 4:24 PM | 235724 | 907984168711129300000 | Start | UnitProcedure | ICPP_UPROC1 |
| 8/4/14 4:24 PM | 235730 | 907984168711129300000 | State Change | Starting | ICPP_UPROC1 |
| 8/4/14 4:24 PM | 235732 | 907984168711129300000 | State of Control | $7e0013e8793186653-0004;UnitOp | ICPP_UPROC1 |
| 8/4/14 4:24 PM | 235733 | 907984168711129300000 | Formula | F1 | ICPP_UPROC1 |
| 8/4/14 5:34 PM | 235746 | 907984168711129300000 | End of Control | ICPP_OP1;UnitOp | ICPP_UPROC1 |
| 8/4/14 5:34 PM | 235750 | 907984168711129300000 | End | COMPLETE | ICPP_PROC |
| 8/4/14 5:34 PM | 235753 | 907984168711129300000 | End of Control | ICPP_UPROC1;UnitProcedure | ICPP_PROC |
| 8/4/14 5:34 PM | 235758 | 907984168711129300000 | End | COMPLETE | ICPP_PROC |
| 8/4/14 5:34 PM | 235759 | 907984168711129300000 | BatchEnd | PROCEDURE | ICPP_PROC |

402a

SERVER 2

| EventTime | EventID | ExecutionID | ConditionName | SubConditionName | Source |
|---|---|---|---|---|---|
| 8/4/14 4:24 PM | 858303 | 907984168711129300000 | Start | UnitOp | ICPP_OP1 |
| 8/4/14 4:24 PM | 858304 | 907984168711129300000 | Formula | F1 | ICPP_OP1 |
| 8/4/14 4:24 PM | 858309 | 907984168711129300000 | Start of Control | ICPP_SCM1;Phase | ICPP_OP1 |
| 8/4/14 5:34 PM | 858321 | 907984168711129300000 | End of Control | ICPP_SCM1;Phase | ICPP_OP1 |

SERVER 3 — 402c

| EventTime | EventID | ExecutionID | ConditionName | SubConditionName | Source |
|---|---|---|---|---|---|
| 8/4/14 4:25 PM | 663400 | 9079841687112933000 | Start | Phase | ICPP_SCM1 |
| 8/4/14 4:25 PM | 663405 | 9079841687112933000 | Start Change | Idle | ICPP_SCM1 |
| 8/4/14 5:35 PM | 663557 | 9079841687112933000 | End | Complete | ICPP_SCM1 |

PROCESS EVENT PROCESSOR (PEP) — 304

KEY FEATURES OF PEP:
1) CAN PROCESS EVENTS FROM MULTIPLE SERVERS FOR A SINGLE BATCH EXECUTION INSTANCE
2) CAN PROCESS EVENTS IN RANDOM SERVER ORDER WITH THE USE OF INTERNAL CACHING
3) CREATES A UNIFORM, HIERARCHICAL BATCH INSTANCE NAMESPACE ACROSS PROCESS SERVERS
4) CREATES UNIQUE NAMESPACE FOR EACH BATCH EXECUTION INSTANCE

PROCEDURE EVENT TABLE — 306

| EventTime | ExecutionID | BatchID | ActivityfullName |
|---|---|---|---|
| 8/4/14 4:24 PM | 9079841687112936901 | 4th_batch1 | \08/04/2014 16:24:34\ehm\9079841687112936901\ICPP_PROC;1 |
| 8/4/14 4:24 PM | 9079841687112936901 | 4th_batch1 | \08/04/2014 16:24:34\ehm\9079841687112936901\ICPP_PROC;1 |
| 8/4/14 4:24 PM | 9079841687112936901 | 4th_batch1 | \08/04/2014 16:24:34\ehm\9079841687112936901\ICPP_PROC;1 |
| 8/4/14 4:24 PM | 9079841687112936901 | 4th_batch1 | \08/04/2014 16:24:34\ehm\9079841687112936901\ICPP_PROC;1 |
| 8/4/14 4:24 PM | 9079841687112936901 | 4th_batch1 | \08/04/2014 16:24:34\ehm\9079841687112936901\ICPP_PROC;1 |
| 8/4/14 4:24 PM | 9079841687112936901 | 4th_batch1 | \08/04/2014 16:24:34\ehm\9079841687112936901\ICPP_PROC;1 |
| 8/4/14 4:24 PM | 9079841687112936901 | 4th_batch1 | \08/04/2014 16:24:34\ehm\9079841687112936901\ICPP_PROC;1 |
| 8/4/14 4:24 PM | 9079841687112936901 | 4th_batch1 | \08/04/2014 16:24:34\ehm\9079841687112936901\ICPP_PROC;1 |

FROM FIG. 4A / TO FIG. 4C / TO FIG. 4E

FIG. 4B

| | | | |
|---|---|---|---|
| 8/4/14 4:24 PM | 9079841687112936901 | 4th_batch1 | \08/04/2014 16:24:34\ehm\9079841687112936901\\CPP_PROC;1\... |
| 8/4/14 4:24 PM | 9079841687112936901 | 4th_batch1 | \08/04/2014 16:24:34\ehm\9079841687112936901\\CPP_PROC;1\... |
| 8/4/14 4:24 PM | 9079841687112936901 | 4th_batch1 | \08/04/2014 16:24:34\ehm\9079841687112936901\\CPP_PROC;1\... |
| 8/4/14 4:24 PM | 9079841687112936901 | 4th_batch1 | \08/04/2014 16:24:34\ehm\9079841687112936901\\CPP_PROC;1\... |
| 8/4/14 4:24 PM | 9079841687112936901 | 4th_batch1 | \08/04/2014 16:24:34\ehm\9079841687112936901\\CPP_PROC;1\... |
| 8/4/14 4:24 PM | 9079841687112936901 | 4th_batch1 | \08/04/2014 16:24:34\ehm\9079841687112936901\\CPP_PROC;1\... |
| 8/4/14 5:34 PM | 9079841687112936901 | 4th_batch1 | \08/04/2014 16:24:34\ehm\9079841687112936901\\CPP_PROC;1 |
| 8/4/14 5:34 PM | 9079841687112936901 | 4th_batch1 | \08/04/2014 16:24:34\ehm\9079841687112936901\\CPP_PROC;1 |
| 8/4/14 5:34 PM | 9079841687112936901 | 4th_batch1 | \08/04/2014 16:24:34\ehm\9079841687112936901\\CPP_PROC;1 |
| 8/4/14 5:34 PM | 9079841687112936901 | 4th_batch1 | \08/04/2014 16:24:34\ehm\9079841687112936901\\CPP_PROC;1 |
| 8/4/14 5:34 PM | 9079841687112936901 | 4th_batch1 | \08/04/2014 16:24:34\ehm\9079841687112936901\\CPP_PROC;1 |
| 8/4/14 5:34 PM | 9079841687112936901 | 4th_batch1 | \08/04/2014 16:24:34\ehm\9079841687112936901\\CPP_PROC;1 |
| 8/4/14 5:34 PM | 9079841687112936901 | 4th_batch1 | \08/04/2014 16:24:34\ehm\9079841687112936901\\CPP_PROC;1 |

FROM FIG. 4B

Procedure Analyst Services Configuration

| PEP Configuration | Experion Connections | OPCHDA Configuration | PEP Diagnostics |

Description
This form provides information for each Experion connection associated with the Process Event Processor

Connections

| | Connection Name | Procedure Event Table Name |
|---|---|---|
| 1 | cibu-exp430-nr1 | prochis |
| 2 | | |
| 3 | | |
| 4 | | |
| 5 | | |
| 6 | | |
| 7 | | |
| 8 | | |
| 9 | | |
| 10 | | |
| 11 | | |
| 12 | | |

The Connection Name should match the ConnectionName entered in the PA Connection State Tool.

Note: The names are case sensitive and should match exactly

— 504

Enable Procedure Event Table ☑ ← 502

[ OK ]  [ Cancel ]  [ Apply ]  [ Help ]

2) BUILD PET TYPE TABLE AND POPULATE EVENT TYPE DEFINITIONS, TABLE: TPB_PET_EVENT_DEFINITIONS — 604

| EventTypeID | EventTypeName | EventTypeDefName1 | EventTypeDefName2 | EventTypeDefName3 | Inactive |
|---|---|---|---|---|---|
| 993 | BatchCreate | Batch Creation | [Value] | [Value] | 0 |
| 300 | HeaderVersion | Header | Version | [Value] | 0 |
| 301 | HeaderVersionDate | Header | Version Date | [Value] | 0 |
| 302 | HeaderScale | Header | Scale Factor | [Value] | 0 |
| 508 | Mode Change | Mode Changed | Mode Change | [Value] | 0 |
| 507 | Mode Command | Mode Commanded | Mode Command | [Value] | 0 |
| 510 | Active Step Change | Active Step Change Command Attempted | Active Step Change Commencing | [Value] | 0 |
| 608 | Param Download Verified | Param Download Verified | [Value] | [Value] | 0 |
| 991 | Removal Requested | Removal Requested | Batch Deletion | [Value] | 0 |
| 4416 | EquipmentBind | Equipment Bind | [Value] | [Value] | 0 |
| 1993 | BatchStart | Batch Start | [Value] | [Value] | 0 |
| 500 | Command | Command | [Value] | [Value] | 0 |
| 1416 | Start | Procedure Started | [Value] | [Value] | 0 |
| 2416 | Start | Unit Procedure Started | [Value] | [Value] | 0 |
| 3416 | Start | Operation Started | [Value] | [Value] | 0 |
| 414 | State | State Change | [Value] | [Value] | 0 |

PETTypeTable: EventTypeID — 605

| EVENT NAME | EventTypeDefName1 | EventTypeDefName2 | EventTypeDefName3 |
|---|---|---|---|
| BatchCreate | Batch Creation | Create | [Value] |
| Header Version | Version | Header | [Value] |
| Header Version Date | Version Date | Header | [Value] |
| Mode Change | Mode Change | Change | [Value] |
| Mode Command | Mode Command | Command | [Value] |
| Active Step Change | Active Step Change | Change | [Value] |
| Param Download Verified | Param Download Verified | Recipe | [Value] |
| Batch Deletion | Batch Deletion | End | [Value] |
| HeaderScale | Scale Factor | Header | [Value] |
| EquipmentBind | Equipment Bind | Change | [Value] |
| BatchStart | Batch Start | Start | [Value] |
| Command | State Command | Command | [Value] |
| Start | Procedure Started | Start | [PublicName] |
| State | State Change | Change | [Value] |
| StepStart | Step Start | Change | [Value] |
| StepEnd | Step End | Change | [Value] |
| Start | Unit Procedure Started | Start | [PublicName] |
| Start | Operation Started | Start | [PublicName] |
| Formula | [SubCondition Name] | Recipe | [Value] |
| Report | [SubCondition Name] | Report | [Value] |
| End | Operation Complete | Complete | [Value] |
| End | Unit Procedure Complete | Complete | [PublicName] |
| End | Procedure Finished | Complete | [PublicName] |
| BatchComplete | Batch Complete | End | [Vaule] |

FROM FIG. 7A

| Condition Name | SubConditionName | Source | Description |
|---|---|---|---|
| Batch Creation | Procedure Level | Mr/Instance Recipe Name | n/a |
| Batch Completion | Procedure Level | Mr/Instance Recipe Name | n/a |
| Start | Procedure Level Of Issuing Block | Mr/Instance Recipe Name | Block Type (RCM/SCM);$Actid-DOC Of Issuing Block*;ActivityID |
| End | Procedure Level Of Issuing Block | Mr/Instance Recipe Name | Block Type (RCM/SCM);$Actid-DOC Of Issuing Block*;ActivityID |
| Equipment | Child Recipe Name Or $ Actid-DOC Of Issuing Block | MR RECIPE NAME | ;$Actid-DOC Of Issuing Block;ActivityID |
| Recipe Removal | n/a | Mr/Instance Recipe Name | Control Recipe Name |
| Recipe Version | n/a | Mr/Instance Recipe Name | Header: Version |
| Recipe ModifDate | n/a | Mr/Instance Recipe Name | Header: Modif Date |
| Recipe Scale Factor | n/a | Mr/Instance Recipe Name | Header: Scale Factor |
| Start Of Control | Child Recipe Name Or $ Actid-Doc Of Issuing Block * ; Procedure Level | Mr/Instance Recipe Name | Phase Block Name; $Actid-DOC Of Issuing Block* |
| End Of Control | Child Recipe Name Or $ Actid-DO Of Issuing Block * ; Procedure Level | Mr/Instance Recipe Name | Phase Block Name; $Actid-DOC Of Issuing Block* |

800

| Value | Previous Value | Limit | Eu | Location Tag Name | Public Name |
|---|---|---|---|---|---|
| Batch Id | n/a | n/a | n/a | Asset | Public Name/MR Name |
| Batch Id | n/a | n/a | n/a | Asset | Public Name/MR Name |
| "Child" Or Empty | n/a | n/a | n/a | Asset | Public Name/MR Name |
| "Child" Or Empty | n/a | n/a | n/a | Asset | Public Name/MR Name |
| Ucm Name | n/a | n/a | n/a | Asset | Public Name/MR Name |
| n/a | n/a | n/a | n/a | Asset | Public Name/MR Name |
| Version | n/a | n/a | n/a | Asset | Public Name/MR Name |
| Issue Date | n/a | n/a | n/a | Asset | Public Name/MR Name |
| Scale Factor | n/a | n/a | n/a | Asset | Public Name/MR Name |
| Child Recipe State LoopCount; Resource Acquired; ExecuteON Resource | n/a | n/a | n/a | Asset | Public Name/MR Name |
| Child Recipe State LoopCount; WaitFor Terminal: Release Resource | n/a | n/a | n/a | Asset | Public Name/MR Name |

FROM FIG. 8A

| Condition Name | SubConditionName | Source | Description |
|---|---|---|---|
| Command | n/a | MR/Instance Recipe Name | Block Type (RCM/SCM)$Actid-DOC Of Issuing Block |
| State Change | Previous State | MR/Instance Recipe Name | Block Type (RCM/SCM)$Actid-DOC Of Issuing Block |
| Phase State Change | Previous State | MR/Instance Recipe Name | Block Type (RCM/SCM)$Actid-DOC Of Issuing Block |
| Formula | Formula Parameter NAME | MR/Instance Recipe Name | Phase Block Name;$Actid-DOC Of Issuing Block |
| Status Of Formula Store | Formula Parameter Name | MR/Instance Recipe Name | Phase Block Name;$Actid-DOC Of Issuing Block |
| Report | Report Parameter Name | MR/Instance Recipe Name | Phase Block Name;$Actid-DOC Of Issuing Block |
| Status Of Report Upload | Report Parameter Name | MR/Instance Recipe Name | Phase Block Name;$Actid-DOC Of Issuing Block |
| Step Start | n/a | MR/Instance Recipe Name | Step Name;$Actid-DOC Of Issuing Block |
| Step End | n/a | MR/Instance Recipe Name | Step Name;$Actid-DOC Of Issuing Block |
| Phase Start | ????? | MR/Instance Recipe Name | Phase Block Name;$Actid-DOC Of Issuing Block |
| Phase End | ????? | MR/Instance Recipe Name | Phase Block Name;$Actid-DOC Of Issuing Block |
| Active Step Chg | Previous Block Name | MR/Instance Recipe Name | Block Type (RCM/SCM)$Actid-DOC Of Issuing Block |
| Mode Attribute Change | Previous ModeAttr | MR/Instance Recipe Name | Block Type (RCM/SCM)$Actid-DOC Of Issuing Block |
| Mode Command | n/a | MR/Instance Recipe Name | (RCM OR SCM) $Actid-DOC Of Issuing Block |
| Mode Change | Previous Mode | CONTROL RECIPE NAME | $Actid-DOC Of Issuing Block |
| Acquire | Name Of UCM | MR/Instance Recipe Name | $Actid-DOC Of Issuing Block |
| Release | Name Of UCM | MR/Instance Recipe Name | |
| Acquire | Child Control Recipe Name: | | $Actid-DOC Of Issuing Block |
| Release | Child Control Recipe Name: | | Phase Block Name;$Actid-DOC Of Issuing Block |
| Release | Child Control Recipe Name: | MR/Instance Recipe Name | Phase Block Name;$Actid-DOC Of Issuing Block |

| Value | Previous | Limit | EU | Location Tag Name | Public Name |
|---|---|---|---|---|---|
| The Command | n/a | n/a | n/a | Asset | Public Name/MR Name |
| The Current State | n/a | n/a | n/a | Asset | Public Name/MR Name |
| The Current State | n/a | Low Limit | n/a | Asset | Public Name/MR Name |
| Formula Parameter Value | Height Limit | n/a | EU | Asset | Public Name/MR Name |
| Error Code (Reason Of The Failure) | n/a | n/a | n/a | Asset | Public Name/MR Name |
| Report Parameter Value | Height Limit | Low Limit | EU | Asset | Public Name/MR Name |
| Error Code(Reason Of The Failure) | n/a | n/a | n/a | Asset | Public Name/MR Name |
| LoopCount | n/a | n/a | n/a | Asset | Public Name/MR Name |
| LoopCount | n/a | n/a | n/a | Asset | Public Name/MR Name |
| LoopCount | n/a | n/a | n/a | Asset | Public Name/MR Name |
| LoopCount | n/a | n/a | n/a | Asset | Public Name/MR Name |
| Current Block Name | n/a | n/a | n/a | Asset | Public Name/MR Name |
| New ModeAttr | n/a | n/a | n/a | Asset | Public Name/MR Name |
| Commanded Value | n/a | n/a | n/a | Asset | Public Name/MR Name |
| new Mode | n/a | n/a | n/a | Asset | Public Name/MR Name |
| Resource Block Type (ie UCM) | n/a | n/a | n/a | Asset | Public Name/MR Name |
| Resource Block Type (ie UCM) | n/a | n/a | n/a | Asset | Public Name/MR Name |
| RESOURCE BLOCK TYPE: LoopCount | n/a | n/a | n/a | Asset | Public Name/MR Name |
| Resource Block Type: LoopCount | n/a | n/a | n/a | Asset | Public Name/MR Name |

FROM FIG. 8C

Event:

| EventTime | EventID | ExecutionID | ConditionName | SubConditionName | Source | Description | Value |
|---|---|---|---|---|---|---|---|
| 8/4/14 4:24 PM | 236709 | 9079841687112930000 | BatchCreation | Procedure | ICPP_PROC | NULL | 4th_Batch1 |

PET Namespace created by PEP:
\08/04/2014 16:24:34\ebm\907984168711293690\1\ICPP_PROC:1

FIG. 9A

Event:

| EventTime | EventID | ExecutionID | ConditionName | SubConditionName | Source | Description | Value |
|---|---|---|---|---|---|---|---|
| 8/4/14 4:24 PM | 236719 | 9079841687112930000 | Start of Control | $7e0213e849266dc5-0004;UnitPro | ICPP_PROC | ICPP_UPROC1;;ICPP_UPROC1 | Idle:1:1:1 |

PET Namespace created by PEP:
\08/04/2014 16:24:34\ebm\907984168711293690\1\ICPP_PROC:1

FIG. 9B

Event:

| EventTime | EventID | ExecutionID | ConditionName | SubConditionName | Source |
|---|---|---|---|---|---|
| 8/4/14 4:24 PM | 236724 | 9079841687112930000 | Start | UnitProcedure | ICPP_PROC |

PET Namespace created by PEP:
\08/04/2014 16:24:34\ebm\907984168711293690\1\ICPP_PROC:1\ICPP_UPROC1@$7e0213e849266dc5-0004:1

| Description | Value |
|---|---|
| RCM;$7e0213e849266dc5-0004;$ACTIVITY_7e0013e879318b53 | CHILD |

FIG. 9C

Event:

| EventTime | EventID | ExecutionID | ConditionName | SubConditionName | Source |
|---|---|---|---|---|---|
| 8/4/14 4:24 PM | 236732 | 907984168711293000 | Start of Control | $7e0013e8793318b53-0004;UnitOp | ICPP_PROC1 |

PET Namespace created by PEP:
\08/04/2014 16:24:34\ebm\907984168711293690\\ICPP_PROC:1\\CPP_UPROC1@$7e0213e849266dc5-0004:1\\CPP_DATA1A@$7e0013e879318b53-0004:1

| Description | Value |
|---|---|
| ICPP_DATA1A,$7e0213e849266dc5-0004;ICPP_OP1 | Idle;1;1;1 |

FIG. 9D

Event:

| EventTime | EventID | ExecutionID | ConditionName | SubConditionName | Source | Description | Value |
|---|---|---|---|---|---|---|---|
| 8/4/14 4:24 PM | 858303 | 907984168711293000 | Start | UnitOp | ICPP_OP1 | RCM,$7e0013879318b53-0004;$ACTIVITY_3f0015dd7931fa26 | Child |

PET Namespace created by PEP:
\08/04/2014 16:24:34\ebm\907984168711293690\\ICPP_PROC:1\\CPP_UPROC1@$7e0213e849266dc5-0004:1\\CPP_DATA1A@$7e0013e879318b53-0004:1

FIG. 9E

METHOD AND APPARATUS FOR RETRIEVING TIME-BASED EVENT DATA INTO UNIFIED ACTIVITY HIERARCHY ACROSS PROCESS CLUSTERS

CROSS-REFERENCE TO RELATED APPLICATION AND PRIORITY CLAIM

This application claims priority under 35 U.S.C. §119(e) to U.S. Provisional Patent Application No. 62/076,841 filed on Nov. 7, 2014, which is hereby incorporated by reference in its entirety.

TECHNICAL FIELD

This disclosure relates generally to industrial process control and automation systems. More specifically, this disclosure relates to a method and apparatus for retrieving time-based event data into a unified activity hierarchy across process clusters.

BACKGROUND

Industrial process control and automation systems are often used to automate large and complex industrial processes. These types of systems routinely include sensors, actuators, and controllers. The controllers typically receive measurements from the sensors and generate control signals for the actuators.

A batch automation process denotes one type of process that takes place over a period of time in a control and automation system. Notifications generated during a batch execution can be used to regenerate batch activity information, which generally involves reconstructing what occurred during a prior batch execution. The regenerated batch activity information could be used to support reporting and analysis functions. Current products can typically regenerate batch activity information based on information from a single notification server.

SUMMARY

This disclosure provides a method and apparatus for retrieving time-based event data into a unified activity hierarchy across process clusters.

In a first embodiment, a method includes receiving notifications associated with batch execution instances executed by multiple devices, where the notifications identify events occurring in an industrial process control and automation system. The method also includes creating a unique namespace for association with the notifications. The method further includes storing records identifying the notifications in a unified activity hierarchy based on the unique namespace.

In a second embodiment, an apparatus includes at least one interface configured to receive notifications associated with batch execution instances executed by multiple devices. The notifications identify events occurring in an industrial process control and automation system. The apparatus also includes at least one processing device configured to create a unique namespace for association with the notifications and store records identifying the notifications in a unified activity hierarchy based on the unique namespace.

In a third embodiment, a non-transitory computer readable medium embodies a computer program. The computer program includes computer readable program code for receiving notifications associated with batch execution instances executed by multiple devices, where the notifications identify events occurring in an industrial process control and automation system. The computer program also includes computer readable program code for creating a unique namespace for association with the notifications. The computer program further includes computer readable program code for storing records identifying the notifications in a unified activity hierarchy based on the unique namespace.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 5 illustrates an example graphical user interface for configuring functionality associated with the unified activity tool according to this disclosure;

FIGS. 8A and 8B illustrate an example chart containing definitions for various types of batch events generated by a process cluster that can be mapped into a procedure event table according to this disclosure;

FIGS. 9A through 9E illustrate examples of how a procedure event table namespace can be constructed from batch events generated by a process cluster using methods described in this disclosure;

DETAILED DESCRIPTION

FIGS. 1 through 17, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
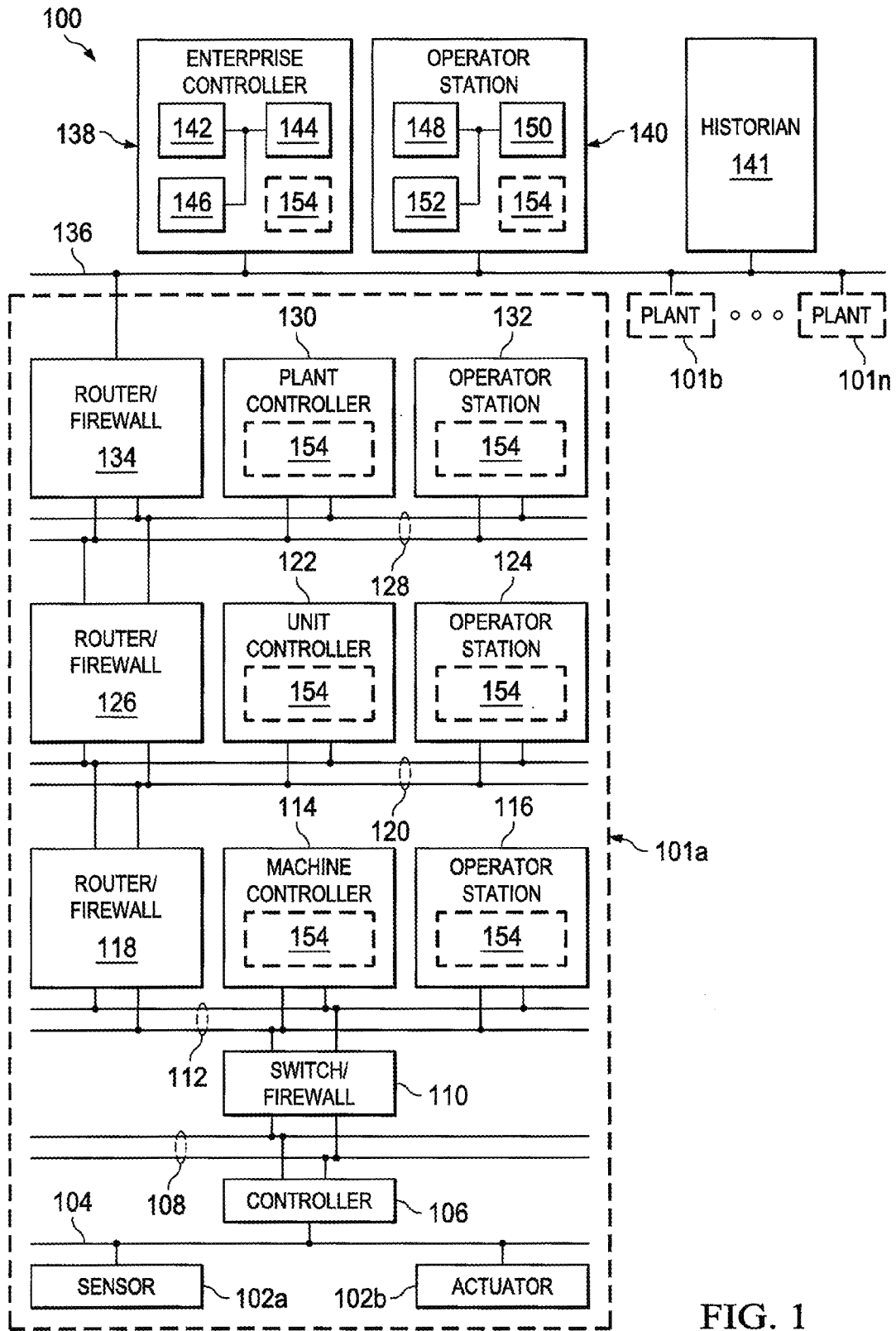
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

As described above, conventional industrial process control and automation systems can include products that use notifications generated by a single notification server to regenerate batch activity information associated with a batch automation process. Unfortunately, these products require a batch instance to be executed on a single notification server, and a unified namespace can only be created based on the event sequencing for that single notification server. Many industrial process control and automation systems actually include multiple servers that can function as notification servers (such as any of the controllers shown in FIG. 1 that are implemented as servers), and these servers can be grouped into multiple process clusters.

In accordance with this disclosure, one or more components of the system 100 support the use of a unified activity tool 154 for creating and managing a unique namespace across multiple process servers to create a unified activity hierarchy for batch execution instances. The unified activity tool 154 can collect information (such as notifications) from the multiple servers and associate the information with the appropriate devices within a unique namespace that spans across the multiple servers. For example, a batch activity hierarchy can be maintained by creating and maintaining a unique namespace for a single batch execution instance, and this strategy can be applied to all batch execution instances. Among other things, this approach does not require a single batch instance to be executed on a single notification server or a unified namespace to be created based on the event sequencing of a single notification server. Rather, this approach can build a unified namespace even if batch instances are executed across multiple notification servers in any server order.

In this way, the unified activity tool 154 supports techniques for creating and managing a unique namespace across process servers to produce a unified activity hierarchy for any batch execution instance. This can, for example, allow the regeneration of batch activities from multiple notification servers using the unified hierarchy when notifications are dispersed across the multiple notification servers.

The unified activity tool 154 includes any suitable structure supporting the creation or use of a unified activity hierarchy to associate time-based notifications with devices in an industrial process control and automation system. The unified activity tool 154 could, for example, represent a computing device having at least one processor, at least one memory, and at least one network interface. The unified activity tool 154 could represent a stand-alone component (such as a computing device designated solely for this purpose) or be integrated into another component (such as a computing device implementing control functionality on some level of the system 100). The logic of the unified activity tool 154 could be implemented using hardware components only or using hardware components and software/firmware instructions.

Additional details regarding specific implementations of the unified activity tool 154 are provided below. In some embodiments, the unified activity tool 154 can be realized as a set of software components collected into a service called a Process Event Processor (PEP). Also, in some embodiments, the PEP can connect to multiple HONEYWELL EXPERION clusters or other notification servers and process notifications from the clusters into regenerated batch activities that are stored as a single structure in a relational database (such as in the historian 141). One example way this can be practiced is by a Manufacturing Execution System (MES), which can extract information from a single table (called a procedure event table or "PET") for purposes of advanced analysis or regulatory compliance. Another way this can be practiced is by providing post-execution plant operational information for reports and queries.

In particular embodiments, the industrial process control and automation system 100 can support the use of unit control modules (UCMs), class based recipes (CBRs), recipe control modules (RCMs), sequential control modules (SCMs), control modules (CMs), and phase control modules (PCMs). Various notifications generated by these components could be stored in a PET and managed as described here. Additional details regarding these types of modules are provided in U.S. Pat. Nos. 7,630,777 and 8,429,654 (both of which are hereby incorporated by reference in their entirety).

Although FIG. 1 illustrates one example of an industrial process control and automation system 100, various changes may be made to FIG. 1. For example, a control system could include any number of sensors, actuators, controllers, servers, operator stations, networks, and unified activity tools. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which time-based event data can be placed into a unified activity hierarchy. This functionality can be used in any other suitable device or system.

Figure 2:
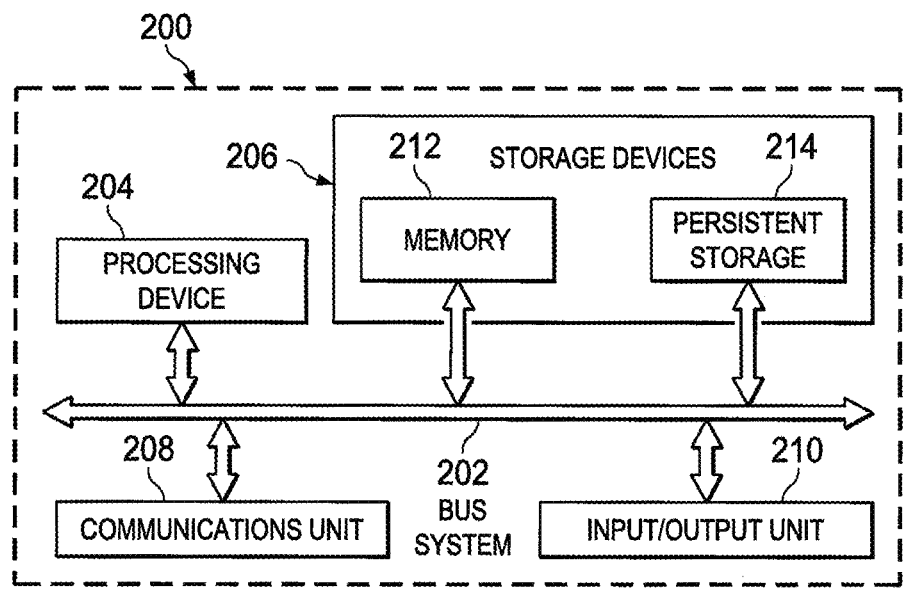
FIG. 2 illustrates an example device for retrieving time-based event data into a unified activity hierarchy across process clusters according to this disclosure.

FIG. 2 illustrates an example device 200 for retrieving time-based event data into a unified activity hierarchy across process clusters according to this disclosure. The device 200 could, for example, represent any suitable device in the system 100 of FIG. 1 providing the unified activity tool 154.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a ready only memory, hard drive, Flash memory, or optical disc.

The communications unit 208 supports communications with other systems or devices. For example, the communications unit 208 could include a network interface card that facilitates communications over at least one Ethernet network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

Although FIG. 2 illustrates one example of a device 200 for retrieving time-based event data into a unified activity hierarchy across process clusters, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

Figure 3:
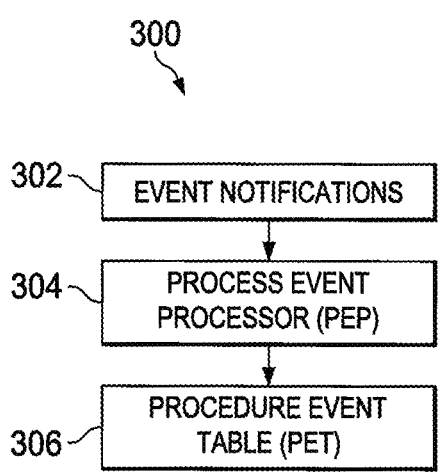
FIG. 3 illustrates an example functional overview of a unified activity tool for retrieving time-based event data into a unified activity hierarchy across process clusters according to this disclosure.

FIG. 3 illustrates an example functional overview 300 of the unified activity tool 154 for retrieving time-based event data into a unified activity hierarchy across process clusters according to this disclosure. As shown in FIG. 3, notifications 302 associated with various events are received at a process event processor (PEP) 304, which processes and stores the event notifications 302 in a procedure event table (PET) 306. One purpose of the PET 306 is to provide a unified batch view of the event notifications 302, and the PEP 304 leverages its namespace generation capabilities to create a unified batch instance collection in the PET 306. The PET 306 is therefore a single table representation of the batch events for procedure execution instances, even if the events from a single execution instance span multiple process servers.

The PET 306 here represents a single table containing a batch events list in a unified namespace. The PET 306 provides a flattened view of a database of batch events. The PET 306 can be used to support various functions. For example, an MES could monitor the single table forming the PET 306 and trigger various actions in response to events in the PET 306. As another example, various regulated industries may be required to monitor and store batch events to support functions like advanced analysis or regulatory compliance.

The PEP 304 includes any suitable structure for creating and managing a unique namespace to create a unified activity hierarchy for batch execution instances. The PEP 304 could, for example, include various software routines or other algorithms executed by one or more processors. The PET 306 includes any suitable structure for storing batch events. The PET 306 could, for instance, denote one or more memories.

Although FIG. 3 illustrates one example of a functional overview 300 of a unified activity tool 154 for retrieving time-based event data into a unified activity hierarchy across process clusters, various changes may be made to FIG. 3. For example, event notifications 302 could be received from any number of sources.

Figure 4D:
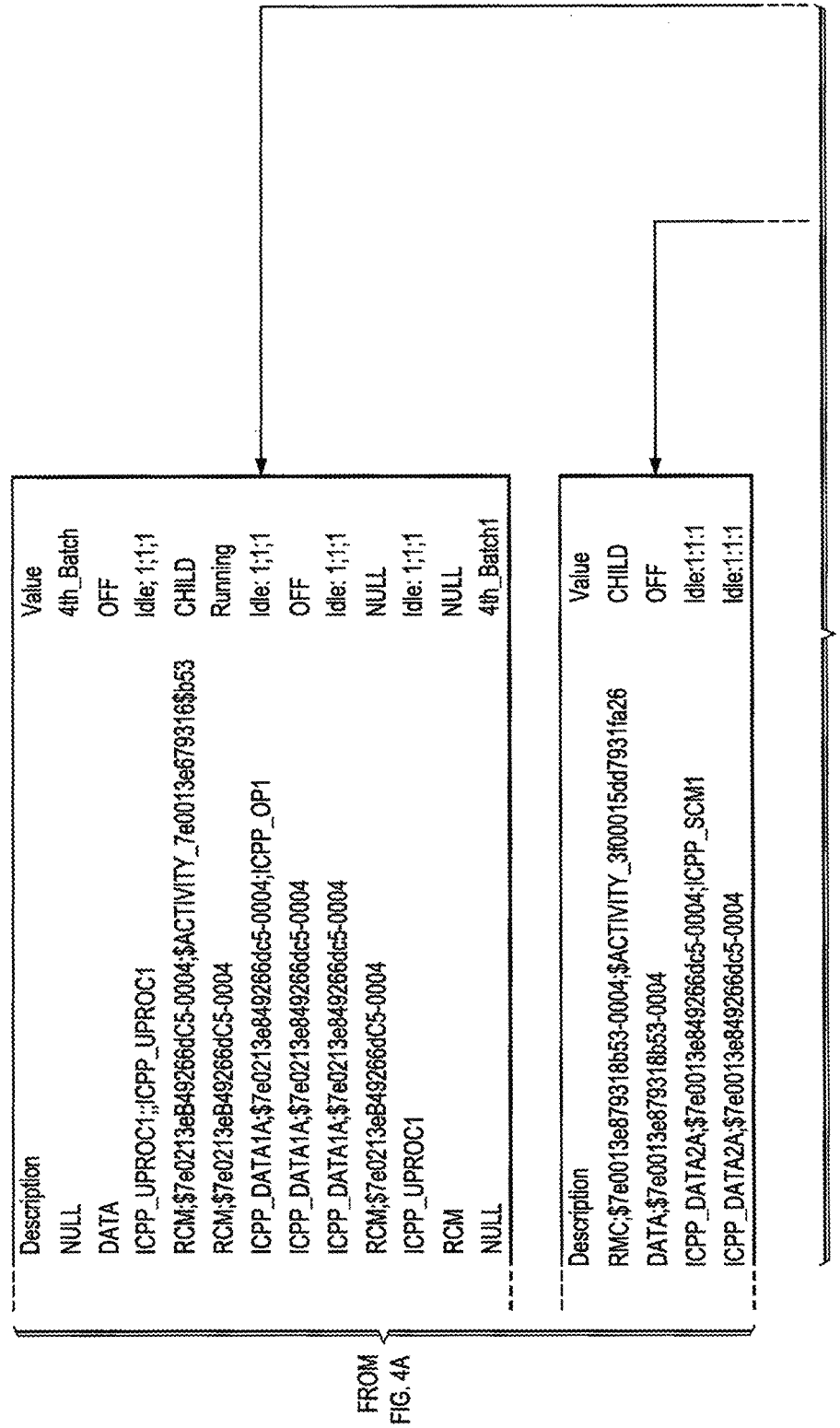
FIG. 4 illustrates example operations of the unified activity tool to retrieve time-based event data into a unified activity hierarchy across process clusters according to this disclosure.
Figure 4E:
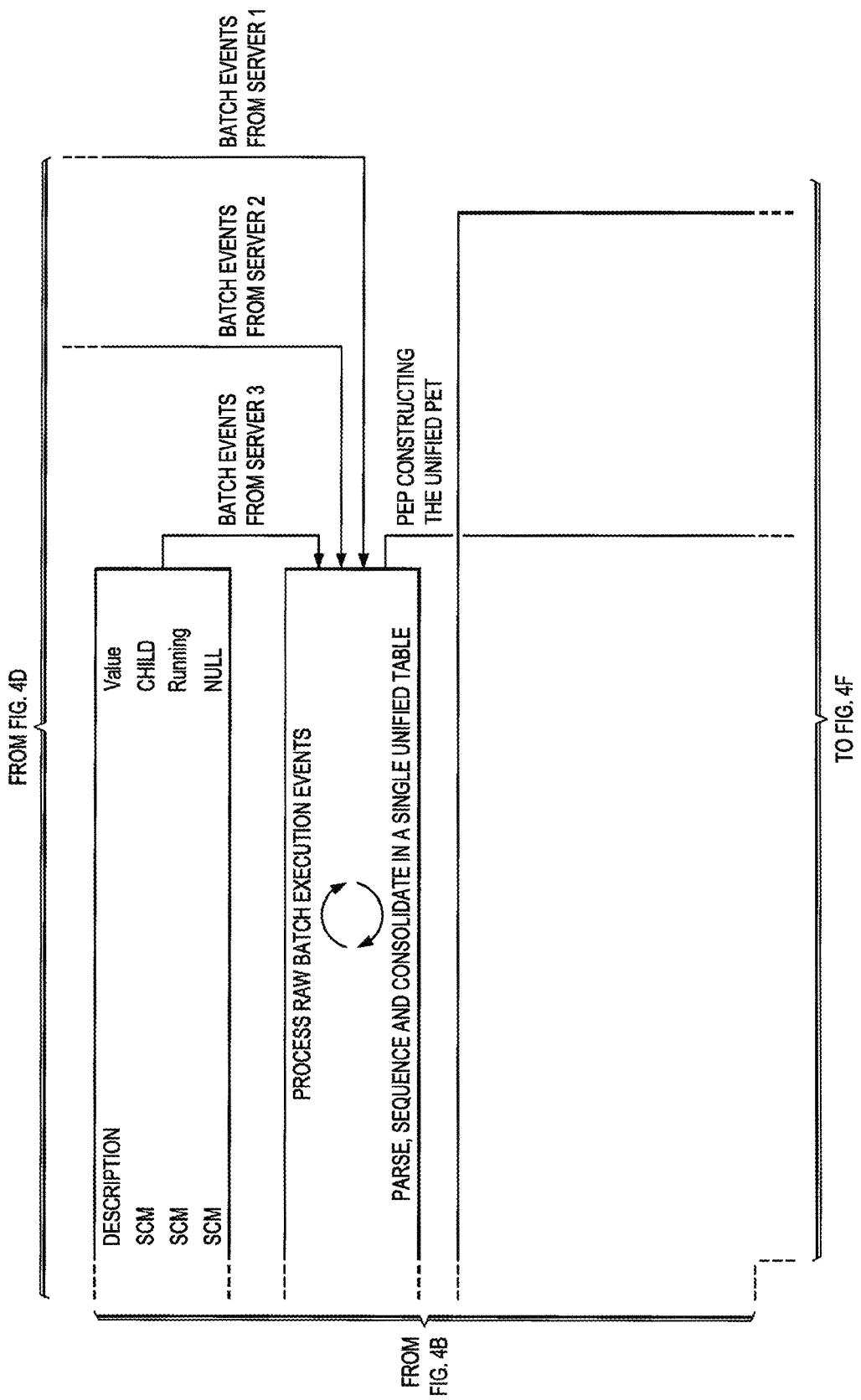
Figure 4F:
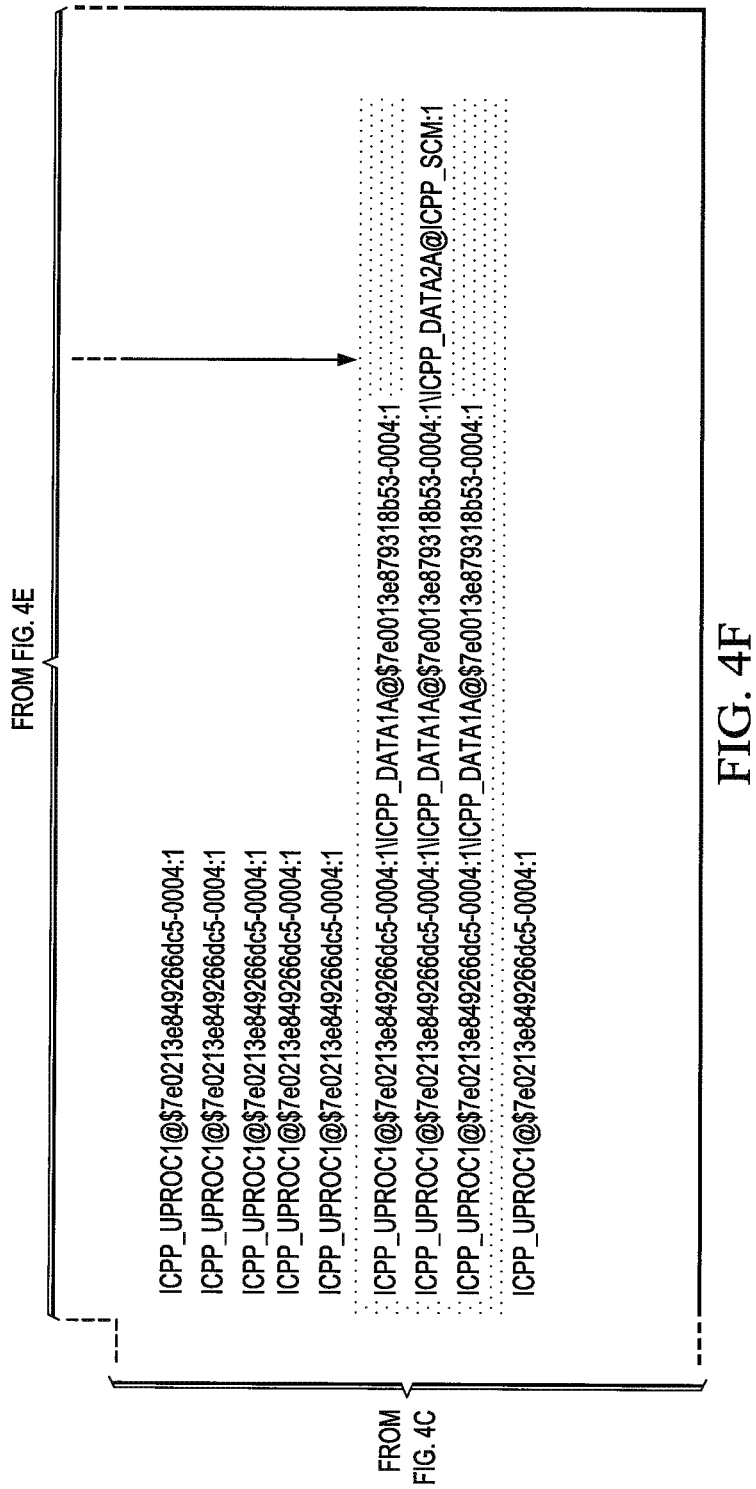

FIG. 4 illustrates example operations of the unified activity tool 154 to retrieve time-based event data into a unified activity hierarchy across process clusters according to this disclosure. As shown in FIG. 4, there are multiple event notification server sources 402a-402c of event notifications. Each event notification here includes an event time associated with an event and an event identifier (Event ID) associated with the event. Each event notification also includes an execution identifier (Execution ID), which can identify a thread of execution for a procedure execution instance. The Execution ID can be common to all procedure levels of a single procedure execution instance. Each event notification further includes a condition name, a subcondition name, a source, a description, and a value of the event. These fields are commonly associated with events in an industrial process control and automation system. Each source 402a-402c generally denotes any suitable structure for generating events, such as a notification server.

The PEP 304 operates here to receive the event notifications. The PEP 304 implements parsing, processing, sequencing, and consolidation operations for batch process events spread across multiple sources into a single unified flat table (the PET 306). The PET 306 shown here includes fields for event times, execution identifiers, batch identifiers, and activity full names of the events. Additional details regarding the data fields in the PET 306 are provided below.

Any suitable types of batch event notifications can be supported in the PET 306. Table 1 illustrates example types of event notifications that can be supported in the PET 306.

TABLE 1

| Event Type | Event |
| --- | --- |
| Header Events | Recipe Header - Scale |
| | Recipe Header - Version |
| | Recipe Header - Version Date |
| Framing Events | Procedure Started |
| | Unit Procedure Started |
| | Operation Started |
| | Unit Procedure Complete |
| | Operation Complete |
| | Procedure Complete |
| Command/State Change Events | State Command |
| | State Change |
| | Step Activated |
| | Step Deactivated |
| | Mode Changed |
| | Mode Command |
| | Attribute Change |
| | Active Step Change Commencing |
| | Creation Bind |
| Recipe Events | Recipe Value |
| | Parameter Download Verified |
| | Report |
| Batch Create Events | Batch Delete |
| | Beginning of Batch |
| | End of Batch |

Although FIG. 4 illustrates one example of operations of the unified activity tool 154 to retrieve time-based event data into a unified activity hierarchy across process clusters, various changes may be made to FIG. 4. For example, the PEP 304 could receive event notifications from any suitable number(s) and type(s) of sources.

FIG. 5 illustrates an example graphical user interface 500 for configuring functionality associated with the unified activity tool 154 according to this disclosure. As shown in FIG. 5, the graphical user interface 500 includes a checkbox 502 that allows a user to enable or disable the use of a PET 306. The graphical user interface 500 also includes various connection entries 504 that (when PET usage is enabled) allows the user to define connections to different servers or other devices that provide event notifications.

The number of connection entries 504 shown in the graphical user interface 500 can vary depending on the implementation. For example, a "number of servers" setting in a configuration table for the PEP 304 or PET 306 can control the number of connection entries 504 shown in the graphical user interface 500. The connection entries 504 here include text boxes for manual entry of data, although any other suitable mechanism could be used to identify connections to event sources. Each PET table is configured by its server connections, which allows the PET table(s) to support servers in any combination. For example, three notification server connections could use the same PET table, or each could have its own PET table.

Although FIG. 5 illustrates one example of a graphical user interface 500 for configuring the functionality associated with the unified activity tool 154, various changes may be made to FIG. 5. For example, any other suitable input mechanism(s) could be used to enable or disable the PET 306 and identify connections.

Figure 6B:
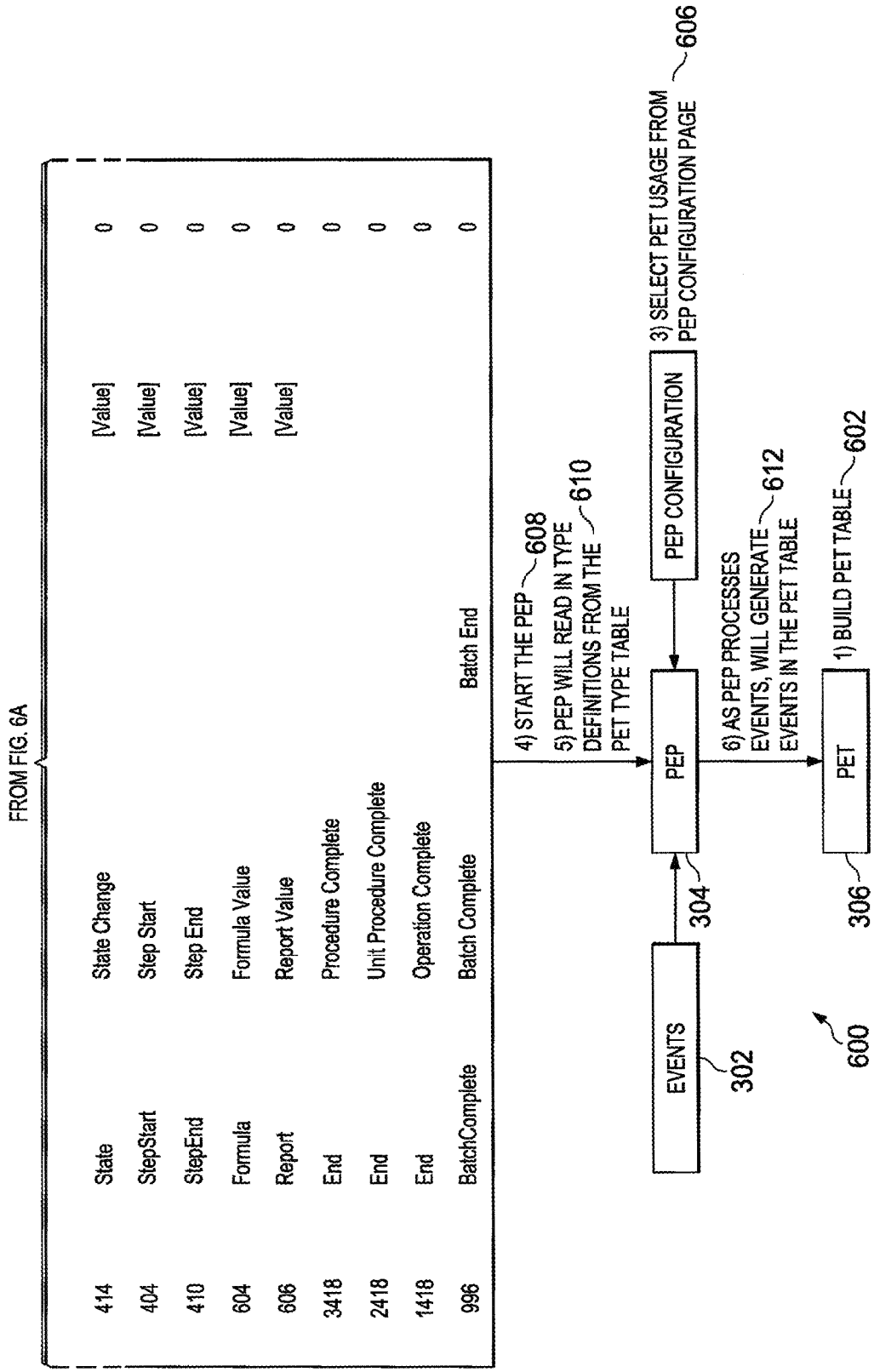
FIG. 6 illustrates an example process for building a procedure event table according to this disclosure.

FIG. 6 illustrates an example process 600 for building a procedure event table 306 according to this disclosure. The process 600 could be used, for example, to construct the PET 306 based on information provided via the graphical user interface 500.

As shown in FIG. 6, the process 600 includes building at least one PET 306 (which can initially be empty) at step 602. The process 600 also includes, at step 604, building a PET type table 605, which includes event type definitions for the events to be received by the PEP 304 and recorded in the PET 306. In this example, the type table 605 identifies an event type identifier, an event type name, one to three event type definition names, and an inactive flag for each event type. The inactive flag can be used to prevent the PEP 304 from generating PET records for inactive types of events. The event type identifier can be based on the event identifiers contained in an event definition table. As can be seen in FIG. 6, various event identifiers end in common numbers (such as "416" for start and "418" for end) since start and end events can occur for multiple types of events. Different suffixes (such as "1," "2," "3," and so on) can be used to distinguish between the starts and ends of different events to support the correct event mappings. In the PET type table 605, values within brackets ([Value]) denote values mapped to a Value field as shown in the chart 800 described below.

The event type definition names (EventTypeDefName1, EventTypeDefName2, and EventTypeDefName3) in the PET type table 605 are either literal values or mapped to fields in the chart 800 described below. Mapped fields are denoted by brackets [ ] in PET 605. For example, EventName, EventType fields in the PET 306 can be mapped to literal fields (EventTypeDefName1, EventTypeDefName2) in the PET 605. An EventValue field in the PET 306 can be mapped to a (EventTypeDefName3) Value mapping field in the chart 800.

In some embodiments, common fields in the PET 306 can include the fields shown in Table 2.

TABLE 2

| | |
|---|---|
| EventTime | Event creation time |
| ExecutionID | Execution instance unique identifier |
| ActivityFullName | Unique procedure instance identifier |
| BatchID | Batch name |
| EventName | Event name |
| EventType | Event type name |
| EventValue | Event value |
| ProcCell | Process Area Name |
| Unit | Equipment Unit Name |

After the PET 306 is ready for use, the manner of PEP usage is identified from a PEP configuration page at step 606. This could include, for example, identifying the user entries in the graphical user interface 500. The PEP 304 is placed into operation at step 608 and reads the event type definitions from the PET type table 605 at step 608. At this point, the PEP 304 knows how to process incoming event notifications 302, and the PEP 304 processes the incoming event notifications 302 to generate records in the PET 306 at step 612.

Although FIG. 6 illustrates one example of a process 600 for building a PET 306, various changes may be made to FIG. 6. For example, while shown as a numbered series of steps, various steps in FIG. 6 could overlap, occur in parallel, occur in a different order, or occur any number of times.

Figure 7A:
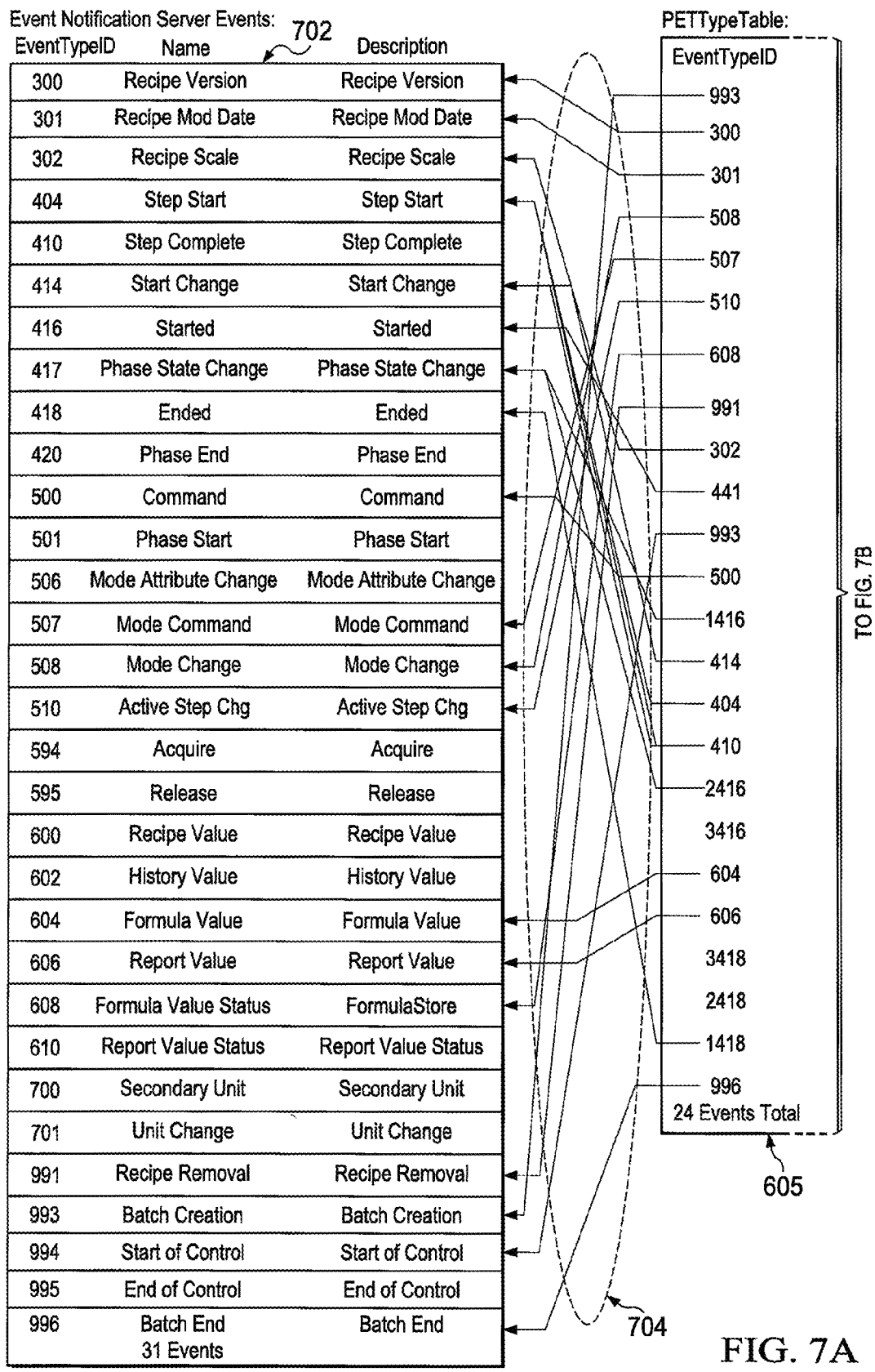
FIG. 7 illustrates an example mapping of events to event types in a procedure event table according to this disclosure.

FIG. 7 illustrates an example mapping 700 of events to event types in a procedure event table 306 according to this disclosure. As shown in FIG. 7, there is a listing 702 of events that may occur in a given system and be provided to the PEP 304. Mappings 704 associate the various events in the listing 702 with the event types identified the PET type table 605.

As can be seen here, different events in the listing 702 can be associated with the same event type in the PET type table 605. This includes the start ("416") and end ("418") events. As noted above, a numerical or other suffix can be added to distinguish between the starts and ends of different events.

This mapping 700 shows graphically the mapping of batch event notifications to PET event types. One uniqueness of this disclosure is that a batch activity hierarchy can be maintained in a single structure by creating and maintaining a unique namespace for every batch execution instance, even those that span across multiple notification servers. This disclosure is different from current products in one way because current products require a batch instance to be executed on a single notification server and a unified namespace can only be created based on event sequencing on a single notification server. This disclosure can build a unified namespace even if a batch instance is executed across multiple notification servers in any server order.

FIGS. 8A and 8B illustrate an example chart 800 containing definitions for various types of batch events generated by a process cluster that can be mapped into a procedure event table according to this disclosure. These events are for illustration only and do not limit the scope of this disclosure to the specific events shown here. The PET 306 could be used to map any other or additional events.

Each procedural level execution instance of a procedure execution instance can be associated with a unique issuing block identifier and phase block name generated by an event notification server source 402a-402c. In some embodiments, the issuing block identifier can be composed of a unique Activity ID and a phase block ID (termed $Actid-DOC). The issuing block identifier and phase block name of an initiating procedure (parent) can be contained in a SubConditionName field of a Start of Control event and passed to a subordinate procedure (child) through a Description field in FIGS. 8A and 8B. In addition, a loop count contained in a Value field of the Start of Control event can be associated with the procedure level execution instance. All procedure level execution instance events for the issuing block identifier may contain the same the phase block name. For example, these events could include Formula and Report events for a phase block associated with the issuing phase block. All subordinate procedure (child) events for the same procedure level execution instance may contain the same Description field. The subordinate (child) procedure execution instance may execute in the same event notification server source or in a different event notification server from the initiating (parent) procedure execution instance. For instance, the Description field can be used by the PEP 304 to generate the unique PET namespace levels in the PET 306 and could include Command, State, and Activation of child procedure level instances using Start of Control events.

Although FIG. 7 illustrates one example of a mapping 700 of events to event types in a PET 306 and FIGS. 8A and 8B illustrate one example of a chart 800 containing definitions for various types of batch events generated by a process cluster that can be mapped into a PET 306, various changes may be made to FIGS. 7 through 8B. For example, these mappings and definitions are for illustration only.

FIGS. 9A through 9E illustrate examples of how a procedure event table namespace can be constructed from batch events generated by a process cluster using methods described in this disclosure. In particular, FIGS. 9A through 9E illustrate examples of how the PEP 304 can construct a unified namespace that uniquely identifies events regardless of source for the PET 306.

As shown in FIG. 9A, when a new batch instance is created, a Batch Creation event can be generated by a batch manager, which is used to establish an initial namespace hierarchy. The initial namespace contains a creation time (EventTime), an execution identifier (ExecutionID), and a name of the top level procedure (Source). This initial namespace represents the prefix to be used for all child namespaces. Note, however, that any suitable field or fields could be used to create the initial namespace.

There is a parent-child relationship between batch events generated by a parent batch procedure level execution instance and events generated by a child batch procedure level execution instance. The batch events for the parent and child may or may not be executed in different process clusters. When the parent procedure level execution instance activates a child procedure level execution instance, a Start of Control event can be issued by an event notification server. The procedure level execution instance initiating event may contain a unique issuing block identifier (SubConditionName), a phase block name (Description), and a loop counter (Value). As shown in FIG. 9B, the PEP 304 creates a unique procedure level execution instance namespace for the child procedure instance that includes the initial namespace of the parent procedure and uses the Start of Control fields SubConditionName, Description, and Value issued by the notification event server. This represents a unique namespace for the procedure level execution instance, which can then be used as a namespace identifier for the procedure instance level as well as a prefix namespace for lower-level procedure level execution instances.

As an example, the phase block name, the issuing block identifier, and the loop count can be concatenated to form a unique name identifier "phaseblockname@issuingBlockID: loopcount". This unique identifier name, combined with the parent identifier namespace, forms a fully qualified namespace for the procedure level execution instance. This namespace can be maintained in an internal cache by the PEP 304 and used in the creation of the namespace of all PET 306 records for a procedure level execution instance. The phase block name can be used for parent procedure level execution events, and the issuing block identifier can be used for children events. Note, however, that any other suitable field or fields could be used to create the namespace for the child process.

As shown in FIG. 9C, when a child procedure level execution instance executes (in the same process cluster or in a different process cluster), its batch events may contain the unique issuing block identifier of the parent procedure level execution instance in the Description field. The Description field may be common to all child procedure level execution instance events of the procedure level. This allows for a single unified namespace across process clusters. Since events from clusters can be processed in any order, a cache can be used (as described below with respect to FIG. 10) to support child events processed before a parent Start of Control event.

As shown in FIG. 9D, when a grand-child procedure level execution instance executes, a Start of Control event is created that contains its own issuing block identifier (SubConditionName), phase block name (Description), and loop counter (Value), which can be passed to the grand-child. As shown in FIG. 9E, when the grand-child procedure level execution instance executes, its events contain the issuing block identifier, phase block name, and loop count information of the parent and child procedure level execution instances. Thus, the namespace of the grand-child procedure level execution instance includes the initial namespace generated for the parent procedure level execution instance and the namespace generated for the child procedure level execution instance as a prefix, along with the namespace associated with the grand-child procedure level execution instance to form a fully qualified procedure level execution instance namespace.

Although FIGS. 9A through 9E illustrate examples of how a procedure event table namespace can be constructed from batch events generated by a process cluster, various changes may be made to FIGS. 9A through 9E. For example, the specific values shown here are for illustration only and are meant to help illustrate one example process in which a unified namespace can be created. Other processes for creating a unified namespace could also be used.

Figure 10:
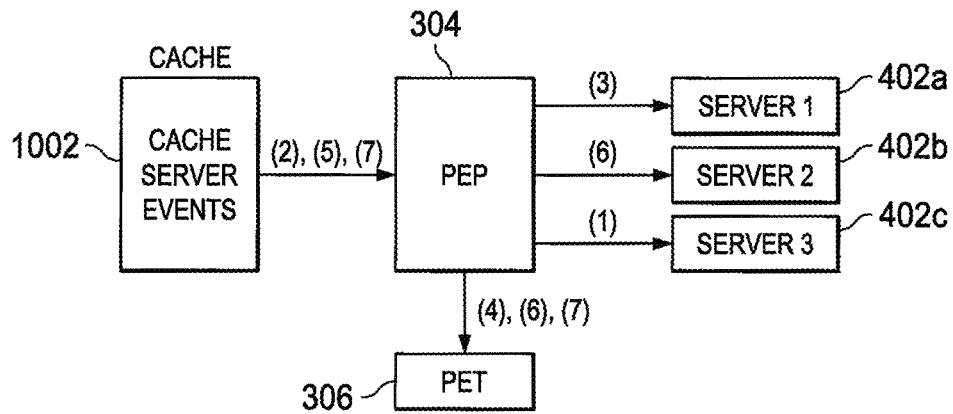
FIG. 10 illustrates an example use of an event cache to facilitate out-of-order event processing by the unified activity tool according to this disclosure.

FIG. 10 illustrates an example use of an event cache 1002 to facilitate out-of-order event processing by the unified activity tool 154 according to this disclosure. The cache 1002 here denotes at least one memory that can be used to temporarily store events that are being processed by the PEP 304 for storage in the PET 306. For example, the cache 1002 could denote external memory accessible by the PEP 304 or internal memory within the PEP 304.

The cache 1002 is maintained by the PEP 304 to support batch event processing across process clusters, including the handling of out-of-sequence batch events. Out-of-sequence batch events may include, for example, child batch events that do not have a parent activity because their parent Start of Control batch events have not yet been processed by the PEP 304 to create the PET namespace. The out-of-sequence batch events are managed in the cache 1002 and processed when the parent events are eventually processed.

Consider the following example defined in FIG. 10. In a first step (1), the PEP 304 receives and processes events associated with a child process from Server 3 (source 402c). However, since a Start of Control event for the child process' parent process from Server 2 (source 402b) has not yet been processed, a namespace for the child procedure instance cannot be created. In this case, the Server 3 events are cached by the PEP 304 in the cache 1002 in step (2). In Step (3), the PEP 304 processes events from Server 1 (source 402a). In step (4), events for the top-level procedure are created by the PEP 304 from the Server 1 events and recorded in the PET 306. In step (5), the Server 3 events in the cache 1002 are examined by the PEP 304, but those cached events cannot be processed yet because the parent's events from Server 2 have not yet been processed to define the child's namespace. In step (6), the PEP 304 creates a namespace and processes events from Server 2 and records the Server 2 events in the PET 306 as children of the events from Server 1. In step (7), since the parent namespace from Server 2 has been created, the PEP 304 processes the Server 3 events in the cache 1002 and records the Server 3 events as children of the Server 2 events in the PET 306.

In this manner, the PEP 304 can help to ensure that out-of-order events for child processes are not lost and are temporarily stored in the cache 1002 until the needed events for parent processes are received and processed. This allows the PEP 304 to create the unified namespace for the events even when out-of-order events are received, since the processing order of events from the sources 402a-402c cannot be predetermine.

Although FIG. 10 illustrates one example use of an event cache 1002 to facilitate out-of-order event processing by the unified activity tool 154, various changes may be made to FIG. 10. For example, the PEP 304 could use one or more caches 1002 to store events associated with any number of event sources. Also, the example process flow shown in FIG. 10 and described above is provided merely as a non-limiting way in which out-of-order events could be received and processed.

FIGS. 11 through 17 illustrate example details of a specific software implementation of the unified activity tool 154 according to this disclosure. For ease of explanation, this implementation of the unified activity tool 154 is described with respect to the control and automation system 100 of FIG. 1. However, this implementation of the unified activity tool 154 could be used in any other suitable system.

Figure 11:
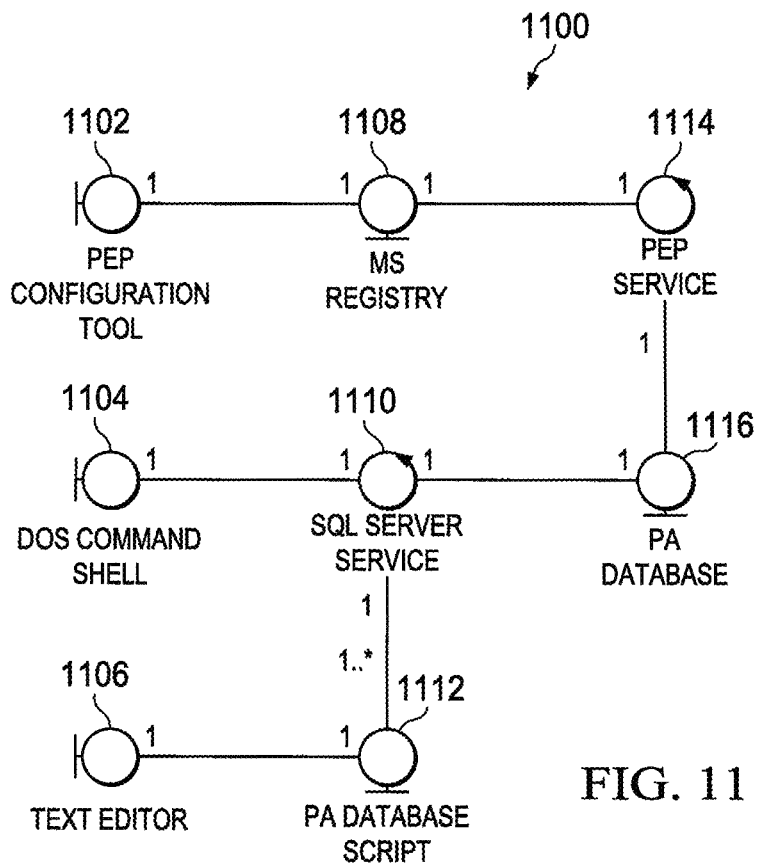
FIGS. 11 through 17 illustrate example details of a specific software implementation of the unified activity tool according to this disclosure.

FIG. 11 illustrates an example use case 1100 for installing and configuring a PET 306. As shown in FIG. 11, a user has access to a PEP configuration tool 1102, a DOS or other command shell 1104, and a text editor 1106. The PEP configuration tool 1102 can be used to interact with a registry 1108 in order to configure a PEP service 1114. The command shell 1104 can be used to interact with an SQL or other database server service 1110, which provides access to a process automation (PA) database 1116. The text editor 1106 can be used to create database scripts 1112, which could be executed by the database server service 1110.

Figure 12:
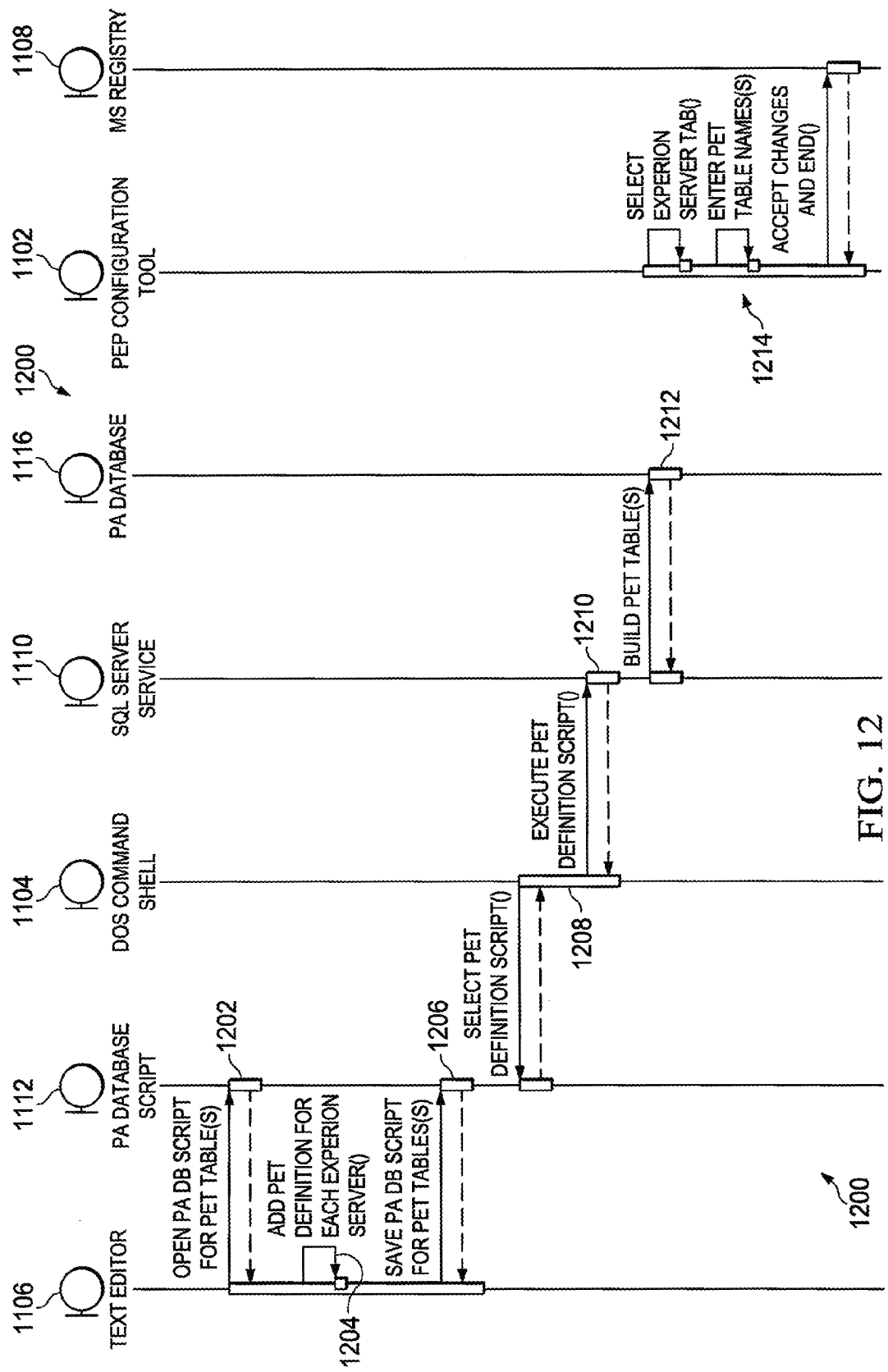

FIG. 12 illustrates an example sequence diagram 1200 in which components are used to install and configure a PET 306. As shown in FIG. 12, a user uses the text editor 1106 to open one or more database scripts 1112 for one or more procedure event tables during operation 1202. During operation 1204, the user uses the text editor 1106 to add PET definitions for EXPERION servers or other sources of event notifications. The user uses the text editor 1106 to save the one or more database scripts 1112 during operation 1206. During operation 1208, the user uses the command shell 1104 to select the one or more database scripts 1112. The user uses the command shell 1104 to cause the database server service 1110 to execute the one or more database scripts 1112 during operation 1210. In response, the database server service 1110 builds one or more procedure event tables in the database 1116 during operation 1212. During operation 1214, the user uses the configuration tool 1102 to select a server's tab, enter the server's procedure event table name, and accept the information. As part of operation 1214, the name(s) of the procedure event table(s) can be stored in the registry 1108.

Figure 13:
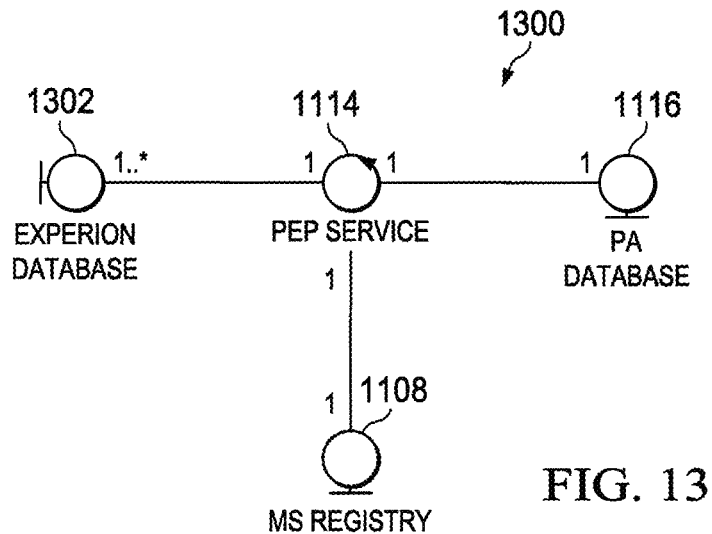
Figure 14:
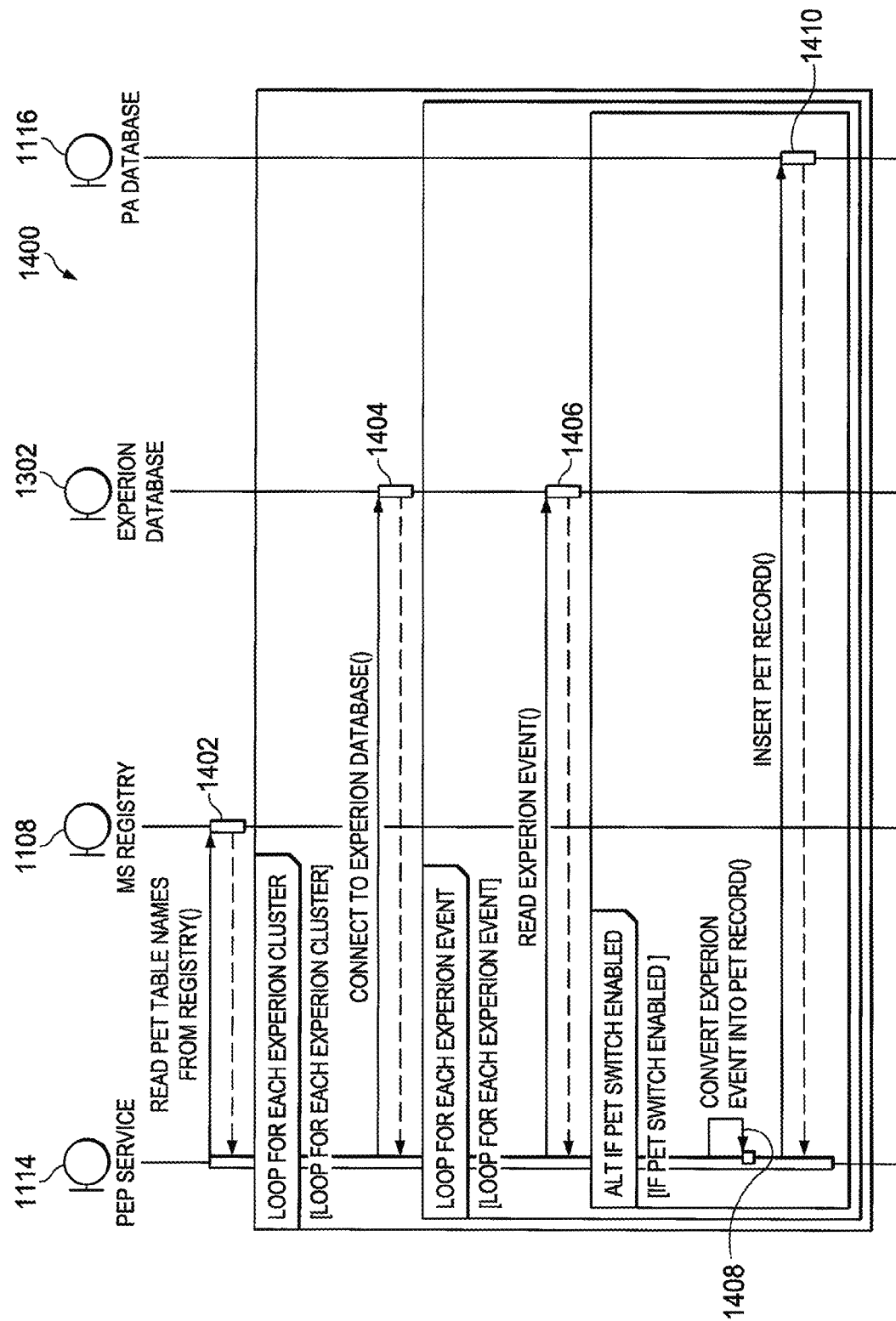

FIG. 13 illustrates an example use case 1300 for converting events into records of a PET 306. As shown in FIG. 13, the PEP service 1114 interacts with an EXPERION or other notification database 1302. FIG. 14 illustrates an example sequence diagram 1400 in which components are used to convert events into records of a PET 306. As shown in FIG. 14, the PEP service 1114 reads one or more names of one or more PETs from the registry 1108 during operation 1402. For each process cluster, the PEP service 1114 accesses a notification database 1302 during an operation 1404. For each event from that notification database 1302, the PEP service 1114 reads an event from the notification database 1302 during an operation 1406. If the PET feature is enabled, the PEP service 1114 converts the event into a PET record during an operation 1408 and inserts the PET record into the database 1116 during an operation 1410.

Figure 15:
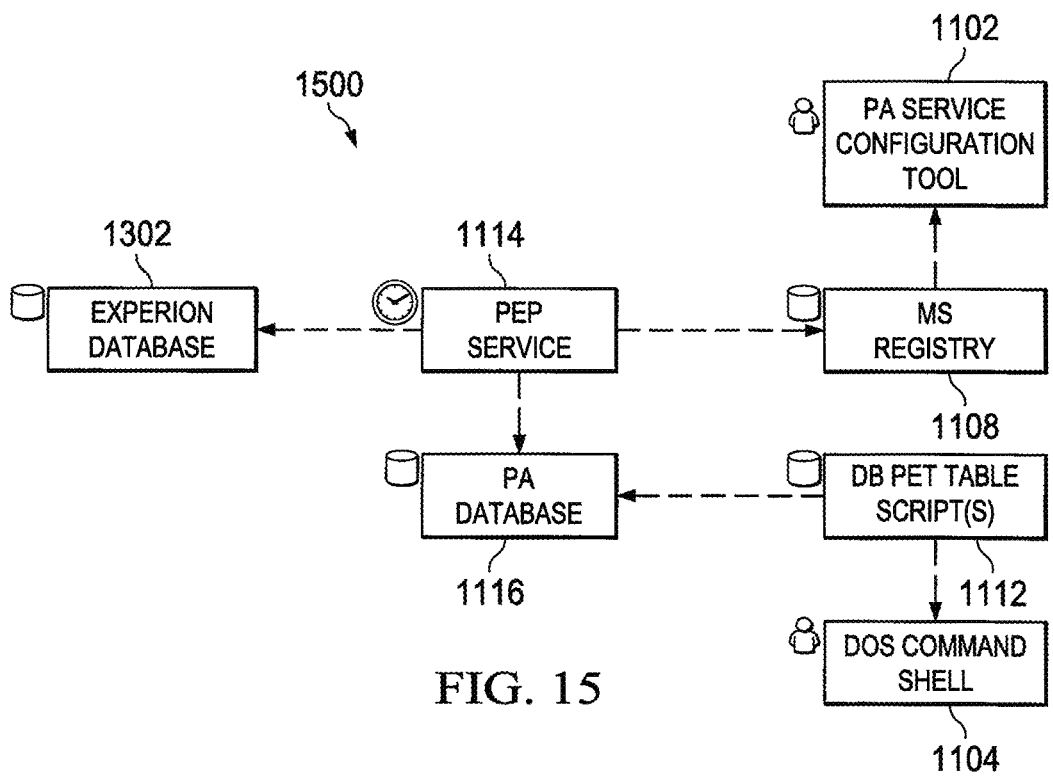
Figure 16:
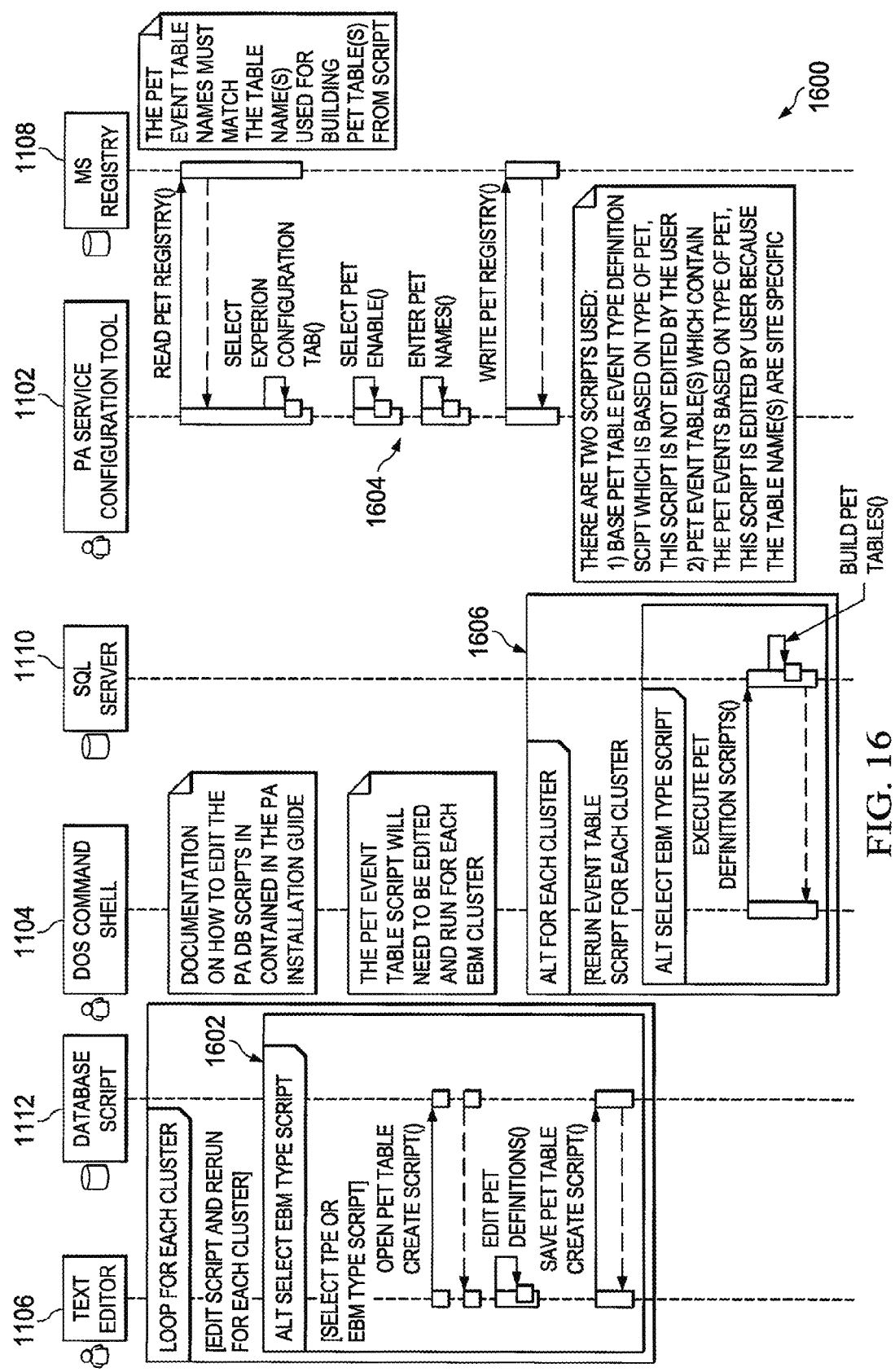

FIG. 15 illustrates an example use case 1500 of the design elements for the PET 306. More specifically, FIG. 15 shows the implementation subsystem components for creating events to be recorded in the PET 306. FIG. 16 illustrates an example sequence diagram 1600 in which components are used to install and configure a PET 306. As shown in FIG. 16, the text editor 1106 is used by a user to open one or more database scripts 1112, edit PET definitions in the script(s), and save the script(s) during operation 1602. The user uses the configuration tool 1102 to read PET data from the registry 1108, enable the use of one or more PETs, enter one or more names for the PET(s), and write the data to the registry 1108 during operation 1604. The user uses the command shell 1104 to cause the database server service 1110 to execute the definition script(s) and build one or more PETs during operation 1606.

Figure 17:
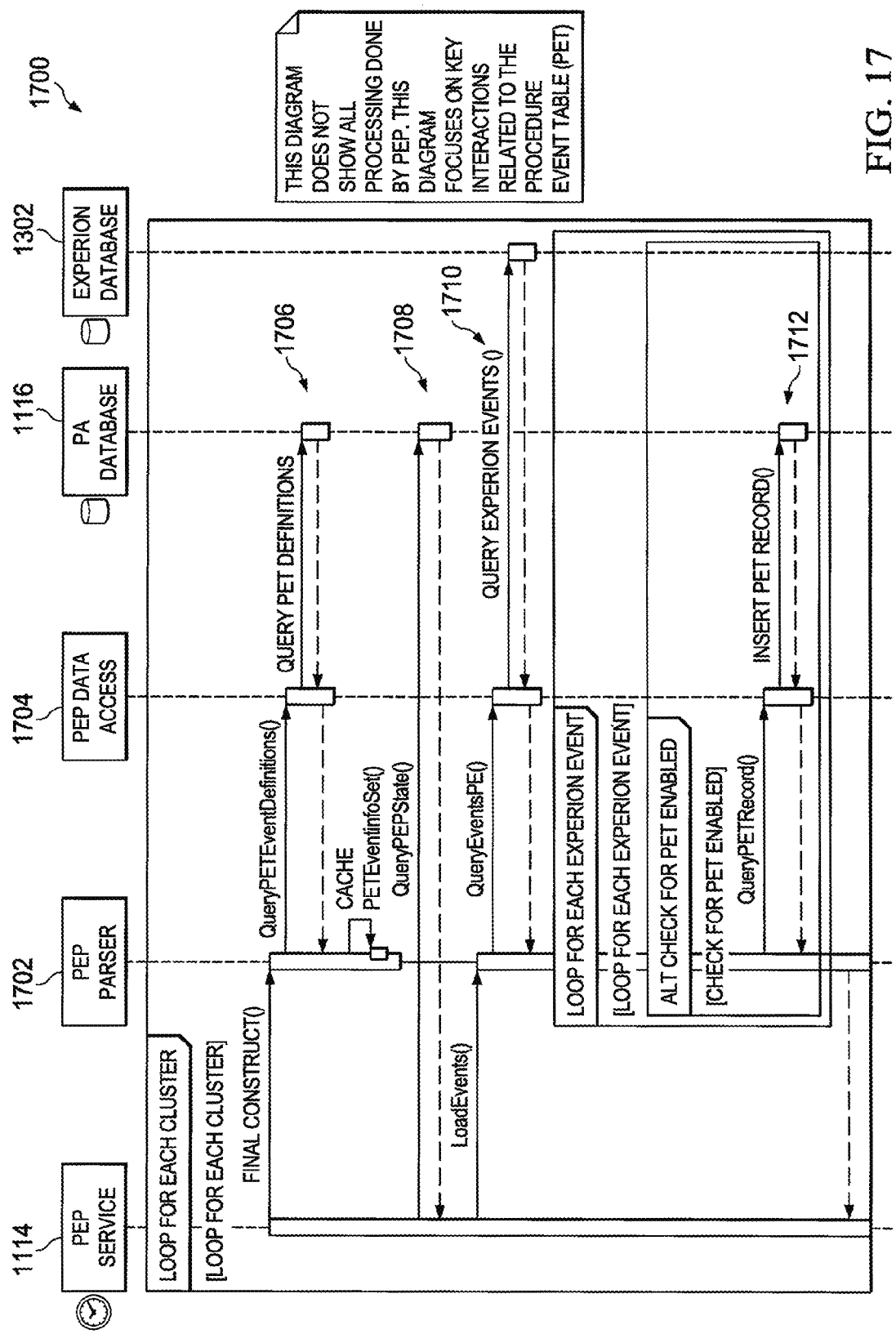

FIG. 17 illustrates an example sequence diagram 1700 in which these components, along with a PEP parser function 1702 and a PEP data access function 1704, are used to convert events into records of a PET 306. As shown in FIG. 17, the PEP service 1114 and functions 1702-1704 query the database 1116 to obtain event definitions, which are then cached, during operation 1706. During operation 1708, the PEP service 1114 queries the database 1116 for the PEP state. If enabled, the PEP service 1114 and functions 1702-1704 are used to query the notification database 1302 for any events during operation 1710. For each identified event, an event record is created and inserted into the database 1116 during operation 1712.

Although FIGS. 11 through 17 illustrate example details of a specific software implementation of the unified activity tool 154, various changes may be made to FIGS. 11 through 17. For example, the various functions shown in FIGS. 11 through 17 could be implemented using any suitable component(s). Also, the signaling shown in various figures may not completely identify all operations and signaling that occur between various components.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving, by an interface, notifications associated with batch execution instances executed by multiple devices, the notifications identifying events occurring in an industrial process control and automation system;
   creating, by a processor, an initial namespace using one or more fields associated with a parent process being executed;
   receiving, by the interface, a start event notification in response to the parent process activating a child process;
   creating, by the processor, a unique namespace for the child process containing the initial namespace and one or more fields associated with the child process;
   storing, by the processor, records identifying the notifications in a unified activity hierarchy based on the unique namespace; and
   providing a unified batch view of the notifications for events of procedure execution instances that span the multiple devices.

2. The method of claim 1, further comprising:
   receiving a second start event notification in response to the child process activating a grand-child process;
   wherein creating the unique namespace further comprises creating a namespace for the grand-child process containing the initial namespace and the namespace for the child process and using one or more fields associated with the grand-child process.

3. The method of claim 2, further comprising:
   using event type definitions to map the start event notifications from the devices to different event records to be recorded in the unified activity hierarchy.

4. The method of claim 1, further comprising:
   caching one or more event notifications associated with the child process received before the start event notification is received from the parent process;
   wherein the unique namespace for the child process is created after the start event notification is received from the parent process.

5. The method of claim 1, wherein the unified activity hierarchy represents a single table.

6. The method of claim 1, wherein the multiple devices comprise multiple notification servers.

7. The method of claim 1, wherein the parent process and child process are executed on different servers of the multiple devices.

8. The method of claim 1, wherein the one or more fields associated with the child process includes at least one of a phase block name, an issuing block identifier, or a loop count.

9. The method of claim 1, wherein one or more event notifications associated with the child process are received out-of-order and cached until the start event notification is received.

10. The method of claim 1, wherein the one or more fields associated with the child process include a description field that contains a unique issuing block identifier of the parent process.

11. The method of claim 1, wherein receiving the notifications comprises receiving an event notification associated with the child process of a first device of the multiple devices prior to the start event notification, and further comprising:
    storing the event notification in a cache,
    wherein the start event notification, related to the event notification, is received from a second device of the multiple devices, and
    wherein creating the unique namespace comprises creating the unique namespace for the event notification of the first device as a child of the start event notification.

12. An apparatus comprising:
    at least one interface configured to:
      receive notifications associated with batch execution instances executed by multiple devices, the notifications identifying events occurring in an industrial process control and automation system; and
      receive a start event notification in response to a parent process activating a child process; and
    at least one processing device configured to:
      create an initial namespace using one or more fields associated with the parent process being executed;
      create a unique namespace for the child process containing the initial namespace and one or more fields associated with the child process;
      store records identifying the notifications in a unified activity hierarchy based on the unique namespace; and
      provide a unified batch view of the notifications for events of procedure execution instances that span the multiple devices.

13. The apparatus of claim 12, wherein:
    the at least one processing device is further configured to receive a second start event notification in response to the child process activating a grand-child process; and
    the at least one processing device is configured to create the unique namespace further by creating a namespace for the grand-child process containing the initial namespace and the namespace for the child process and using one or more fields associated with the grand-child process.

14. The apparatus of claim 12, further comprising:
    a cache configured to temporarily store one or more event notifications associated with the child process that are received before the start event notification is received from the parent process;
    wherein the at least one processing device is configured to create the unique namespace for the child process after the start event notification is received from the parent process.

15. The apparatus of claim 12, wherein the at least one processing device is further configured to use event type definitions to map the start event notifications from the devices to different event records to be recorded in the unified activity hierarchy.

16. The apparatus of claim 12, wherein the unified activity hierarchy represents a single table.

17. A non-transitory computer readable medium embodying a computer program, the computer program comprising computer readable program code that when executed causes at least one processing device to:
receive notifications associated with batch execution instances executed by multiple devices, the notifications identifying events occurring in an industrial process control and automation system;
create an initial namespace using one or more fields associated with a parent process being executed;
receive a start event notification in response to the parent process activating a child process;
create a unique namespace for the child process containing the initial namespace and one or more fields associated with the child process;
store records identifying the notifications in a unified activity hierarchy based on the unique namespace; and
provide a unified batch view of the notifications for events of procedure execution instances that span the multiple devices.

18. The non-transitory computer readable medium of claim 17, wherein:
the computer program further comprises computer readable program code that when executed causes the at least one processing device to receive a second start event notification in response to the child process activating a grand-child process; and
the computer readable program code that when executed causes the at least one processing device to create the unique namespace further comprises computer readable program code that when executed causes the at least one processing device to create a namespace for the grand-child process containing the initial namespace and the unique namespace for the child process and using one or more fields associated with the grand-child process.

19. The non-transitory computer readable medium of claim 17, wherein:
the computer program further comprises computer readable program code that when executed causes the at least one processing device to cache one or more event notifications associated with the child process received before the start event notification is received from the parent process; and
the computer readable program code that when executed causes the at least one processing device to create the unique namespace for the child process comprises computer readable program code that when executed causes the at least one processing device to create the unique namespace for the child process after the start event notification is received from the parent process.

20. The non-transitory computer readable medium of claim 17, wherein the computer program further comprises computer readable program code that when executed causes the at least one processing device to:
use event type definitions to map the start event notifications from the devices to different event records to be recorded in the unified activity hierarchy.

* * * * *